United States Patent
Certain et al.

(10) Patent No.: US 7,530,786 B2
(45) Date of Patent: May 12, 2009

(54) METHOD AND A DEVICE FOR BLOCKING THE PITCH OF A FOLDABLE BLADE OF A ROTORCRAFT ROTOR

(75) Inventors: Nicolas Certain, Aix en Provence (FR); Christophe Perrin, Salon de Provence (FR)

(73) Assignee: Eurocopter, Marignane (FR)

( * ) Notice: Subject to any disclaimer, the term of this patent is extended or adjusted under 35 U.S.C. 154(b) by 442 days.

(21) Appl. No.: 11/522,453

(22) Filed: Sep. 18, 2006

(65) Prior Publication Data

US 2007/0065284 A1 Mar. 22, 2007

(30) Foreign Application Priority Data

Sep. 19, 2005 (FR) .................................. 05 09535

(51) Int. Cl.
*B64C 27/04* (2006.01)
(52) U.S. Cl. .......................................... 416/1; 416/143
(58) Field of Classification Search ..................... 416/1, 416/142, 143, 155
See application file for complete search history.

(56) References Cited

U.S. PATENT DOCUMENTS 3,097,701 A 7/1963 Buivid
3,187,818 A * 6/1965 Barrett et al. ................ 416/105
3,874,817 A * 4/1975 Ferris .......................... 416/143
4,436,483 A 3/1984 Watson et al.
4,738,592 A * 4/1988 Cavanaugh .................. 416/140
5,322,415 A 6/1994 White et al.
6,036,442 A * 3/2000 Certain et al. ................ 416/143

FOREIGN PATENT DOCUMENTS

FR 2 754 779 4/1998

\* cited by examiner

*Primary Examiner*—Edward Look
*Assistant Examiner*—Sean J Younger
(74) *Attorney, Agent, or Firm*—Young & Thompson

(57) ABSTRACT

The invention relates to a rotor for a rotorcraft having foldable hinged blades, the rotor comprising a hub (10), each blade being connected to the hub via a sleeve, each sleeve being hinged about a pitch axis (15) relative to the hub, the rotor including a respective lag damper (14) associated with each blade, each damper being hinged both to the hub and to the corresponding sleeve, the rotor including a system for controlling the pitch of the blades via respective pitch levers (16) secured to each of the sleeves; the rotor includes two abutments designed to co-operate with tooling for blocking the pitch of the blades, a first abutment presenting a bearing surface (35, 36) matching a shape of revolution about an axis (18) of revolution, and a second abutment (33, 39, 70) designed to act axially along said axis of revolution.

17 Claims, 4 Drawing Sheets

METHOD AND A DEVICE FOR BLOCKING THE PITCH OF A FOLDABLE BLADE OF A ROTORCRAFT ROTOR

The present invention relates to a method and to a device for blocking the pitch of a foldable blade of a rotorcraft rotor.

FIELD OF THE INVENTION

The technical field of the invention is that of manufacturing helicopters.

The present invention relates more particularly to a device for preventing or limiting movement of a sleeve of a main lift rotor of a rotorcraft for the purpose of maintaining a determined—and substantially horizontal—pitch for the blade, at least about its pitch axis, in order to make it easier to fold the blade.

BACKGROUND OF THE INVENTION

As set out in particular in U.S. Pat. No. 5,322,415, it is advantageous to be able to fold the blades of a helicopter rotor in order to reduce the space occupied thereby.

The blocking device described in that document comprises a bracket secured to the rotor hub via tines for securing a damper, the bracket being installed on a permanent basis; the device also includes a second bracket that is secured temporarily to the first bracket and to the pitch lever of the blade that is to be prevented from moving, with this being done via three pins; the drawback of that system is that the permanent bracket increases the weight of the rotor hub quite significantly.

French patent No. 2 750 948 also describes a pitch-blocking device in which blocking is obtained by mutual engagement between a finger and a fork, one of those elements being secured to the hub and the other element being secured to a blade; that system includes locking/unlocking actuators, and it is complex.

French patent Nos. 2 754 779 and 2 765 550 describe other systems for blocking foldable blades: the first document describes a device comprising a plurality of blocking rods for preventing relative movement between the hub and a rotary swashplate for driving the pitch control rods; for this purpose, the ball-jointed top end of each blocking rod is secured to a plate of a part connecting a lag damper to the hub; the second document describes a device comprising blocking rods for preventing movement of the non-rotary plate of the pitch control system.

Those systems are relatively complex to use.

OBJECTS AND SUMMARY OF THE INVENTION

An object of the invention is to provide a simplified system for limiting pitch variations of the blades in order to make them easier to fold.

An object of the invention is to provide a method and a device for blocking at least the pitch of the blade sleeves of a rotorcraft rotor, which method and device are improved, or remedy the insufficiencies or drawbacks of prior art pitch-blocking systems, at least in part.

The invention applies to a rotor for a rotorcraft having foldable hinged blades, the rotor comprising a hub, each blade being connected to the hub by a sleeve, each sleeve being hinged about a pitch axis relative to the hub, the rotor including a lag damper associated with each blade, each damper being hinged both to the hub and to the corresponding sleeve, the rotor including a system for controlling blade pitch via a respective pitch lever secured to each sleeve.

The invention proposes tooling that is secured temporarily to the rotor hub in order to prevent a rotor blade from moving in pitch; in accordance with an aspect of the invention, the means that are integrated with (or permanently secured to) the hub for the purpose of securing the tooling to the hub consist essentially in two abutments: a first abutment presenting a bearing surface matching a shape of revolution about an axis of revolution; and a second abutment designed to act axially along said axis of revolution and that is preferably situated in the immediate proximity of the first abutment.

The invention serves to minimize the weight of those blocking means that are installed permanently on the rotor.

The surface of revolution of the first abutment may, in particular, present the shape of a paraboloid, of a hyperboloid, of a cone, or of a sphere, in which case said surface can also constitute the second abutment; nevertheless, the surface is preferably cylindrical and of circular section, and is distinct from the second abutment.

The surface of revolution of the first abutment may be formed inside a "female" part, however it is preferably formed on the outside portion of a "male" part.

The first abutment is preferably secured to the hinged connection system between a lag damper and the hub; when the hinged connection includes a fork receiving a shaft, as described in French patent No. 2 733 961 and U.S. Pat. No. 5,636,970, for example, the first abutment is preferably secured to the shaft.

In a preferred embodiment, the first abutment is formed by an outside surface of a ring through which the shaft passes or that is integrated with the shaft.

The surface of the second abutment may be plane and extends perpendicularly to the axis of revolution of the first abutment.

In a preferred embodiment, this surface matches the shape of a half-torus, in particular when it is in the form of an annular groove formed in a cylindrical ring whose outside surface forms the first abutment; this serves in particular to make it easier to keep the tooling stationary against the abutments, by inserting a cylindrical peg in a portion of the groove.

The tooling presents a first bearing face complementary to the first abutment, and a second bearing face complementary to the second abutment.

In one embodiment of the invention, the tooling includes rods for blocking the rotary swashplate of the system for controlling the pitch of the rotor blades; the top end of each blocking rod includes said first bearing face which is formed by a bore designed to be placed with little clearance around a ring carrying the cylindrical first abutment.

In this embodiment in particular, the tooling includes a pin or peg co-operating with the second abutment that is in the form of a (half-toroidal) annular groove to prevent the blocking rod from moving relative to the hub in translation along the common axis of the bore in the head of the rod and of the first abutment.

In another embodiment of the invention, the tooling includes a blocking shell presenting a depression such as a fork designed to receive a projection of complementary shape and secured to the pitch lever, or a projection such as a finger designed to be received in a depression of complementary shape secured to the pitch lever.

The shell presents a bore (similar to that defined above for the locking rod) that is designed to co-operate with the first abutment. The shell preferably further presents a third bearing face designed to co-operate with a third abutment secured to the hub to prevent the shell from moving in rotation about the axis of revolution of the first abutment (and of the bore).

The tooling preferably includes a screw (and where appropriate a nut), the screw having a head suitable for pressing the (generally plane) second bearing face of the shell against the second abutment integrated in the hub; this screw is preferably engaged in a tapped orifice provided in the hub, in particular in the shaft of the hinged connection between the hub and the lag damper.

In a variant, the shell can be prevented from moving in translation along the axis of revolution of the first abutment by means of a peg engaged in an annular groove of the ring that incorporates the first abutment.

In another aspect, the invention provides a method of blocking the pitch of a blade sleeve of a rotorcraft rotor, the method comprising the following steps:

preliminary blocking of the pitch of all of the sleeves by using the flight controls (with hydraulic assistance); and temporarily securing the pitch blocking tooling to the hub, using the abutments provided for this purpose, and then turning off the hydraulic assistance.

When the tooling includes rods for blocking the rotary swashplate relative to the hub, the method comprises the following steps:

placing the ball joint fitted to the foot of a blocking rod on a screw of the swashplate;

blocking said ball joint with a pin;

placing the fastening fork fitted to the head of the blocking rod on the ring carrying the abutments;

inserting a peg for preventing the head of the rod from moving relative to the ring, the peg being secured by a pin; and then turning off hydraulic assistance to the flight controls.

The blocking of the swashplate as obtained in this way prevents any pitch movement of the sleeves while the blades are being folded, without requiring any hydraulic assistance for the flight controls.

BRIEF DESCRIPTION OF THE DRAWINGS

Other characteristics and advantages of the invention appear from the following description which refers to the accompanying drawings and which illustrates preferred embodiments of the invention, without any limiting character.

FIG. 7 is a section view similar to FIGS. 2 and 5, showing the temporary fastening of tooling bearing against the abutments secured to the hinge, while

MORE DETAILED DESCRIPTION

Figure 1:
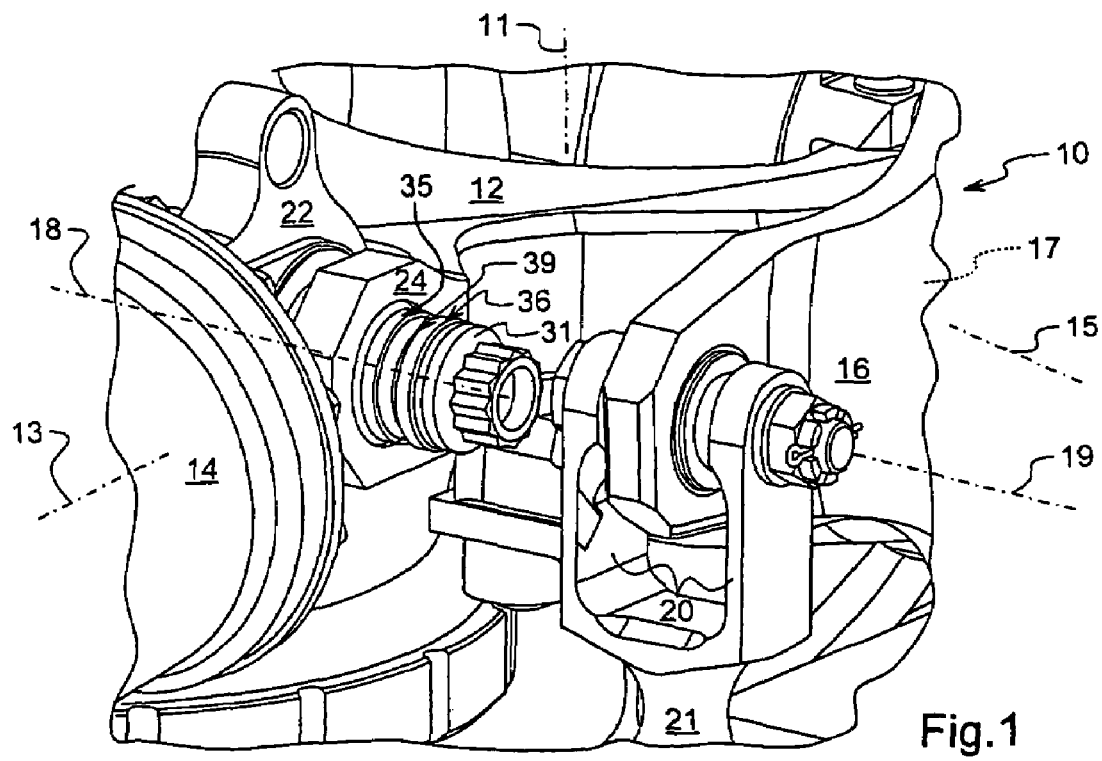
FIG. 1 is a fragmentary perspective view of a hub of a helicopter lift rotor, showing a hinge shaft for a lag damper associated with a first blade of the rotor, and also the pitch lever and the top end of a pitch control rod of a second blade of the rotor that is adjacent to the first blade.

With reference to FIG. 1 in particular, the hub 10 of the helicopter rotor comprises a generally ring-shaped structure 12 that extends around an axis 11 corresponding to the axis of rotation of the rotor.

A sleeve (not shown) serves to secure a first blade to the hub, which blade extends substantially radially relative to the axis 11 along an axis 15; the sleeve is secured to the hub by a laminated spherical abutment (referenced 17) allowing the blade to move relative to the hub about a lag axis substantially parallel to the axis 11, about a pitch axis substantially coinciding with the axis 15, and about a flapping axis substantially perpendicular to the axes 11 and 15.

The sleeve (or blade root) is secured to a laterally-projecting structure 16 referred to as the pitch lever, having a fork 20 hinged to the end thereof about an axis 19, the fork being fitted to the top end of a pitch control rod 21.

Figure 6:
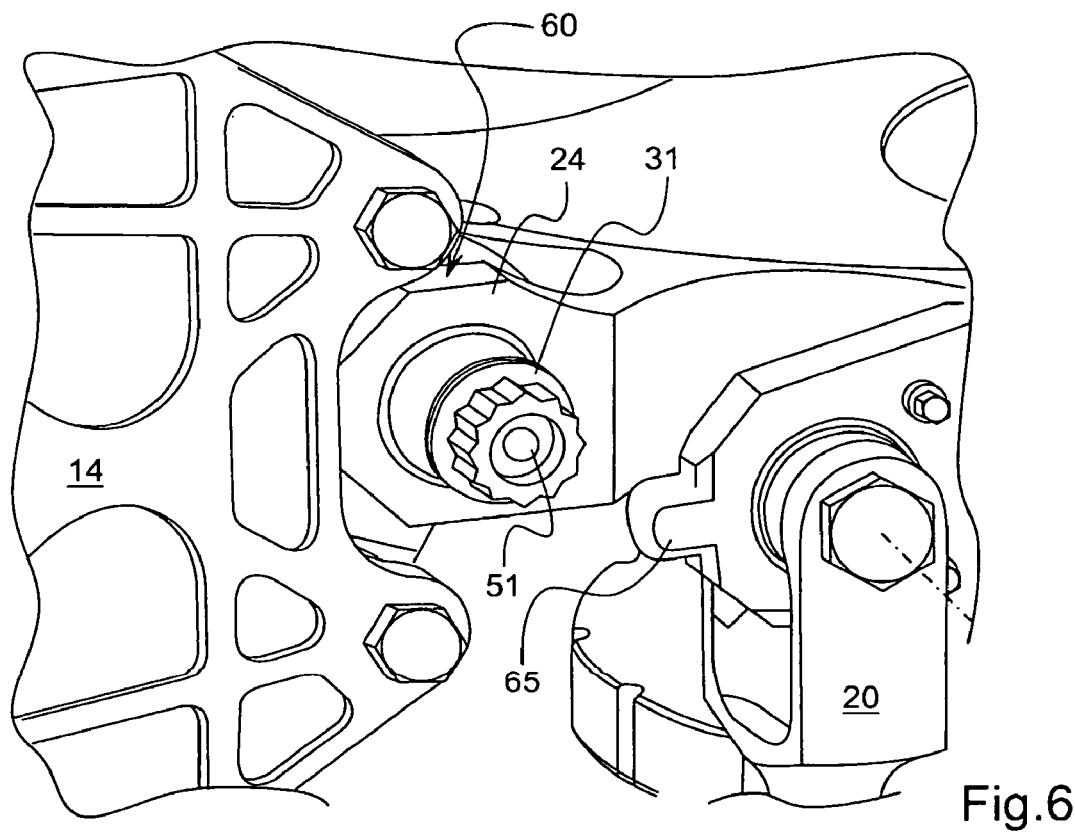
FIG. 6 is a fragmentary perspective view of a helicopter rotor hub showing in particular the hinge of a lag damper and a pitch lever that includes a projection designed to co-operate with tooling fitted on the hinge to block the pitch of the blade fitted with the pitch lever, as shown in FIGS. 7 and 8.
Figure 8:
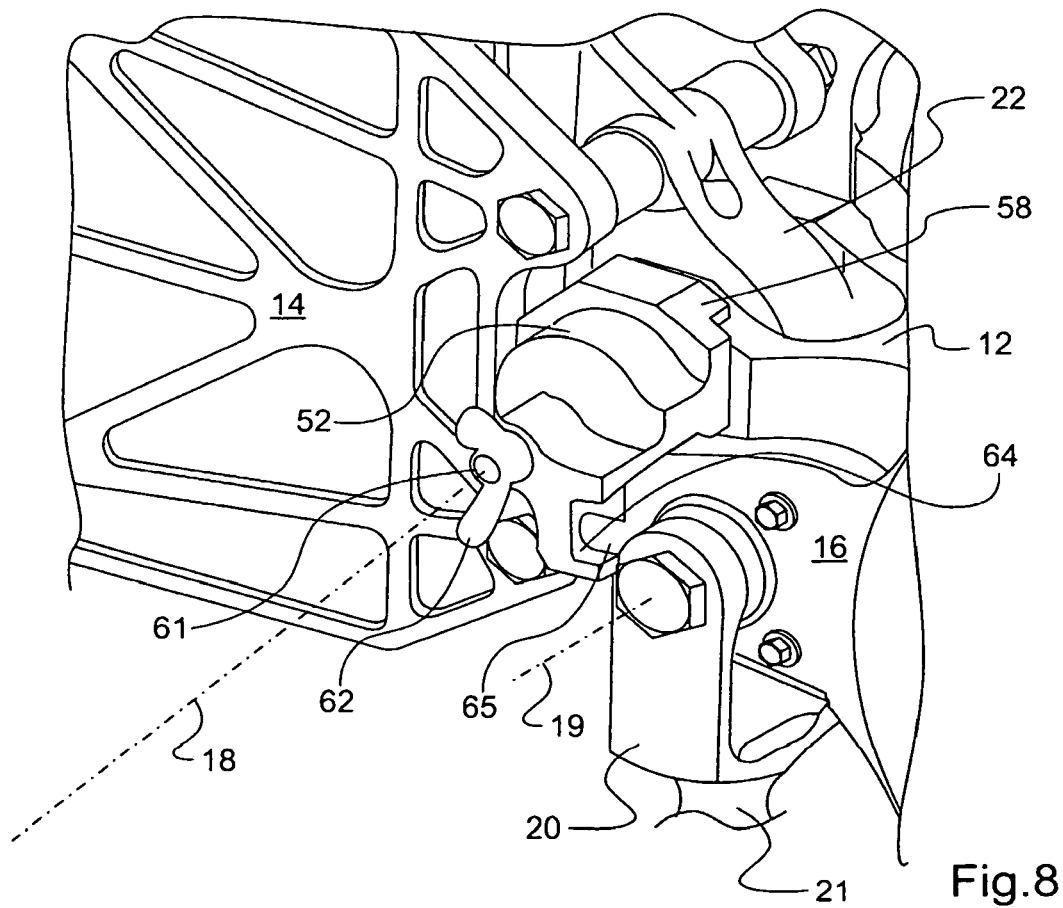
FIG. 8 is a perspective view showing mutual engagement between said projection and a depression provided in the tooling.

A second blade (not shown) is hinged to the first blade in the same manner as described above for the first blade; each of these blades is secured to a lag damper connecting the sleeve of the blade to the hub; only the damper 14 for the second blade can be seen in FIGS. 1, 6, and 8, in particular: the damper 14 extends substantially radially relative to the axis 11 along an axis 13.

Figure 2:
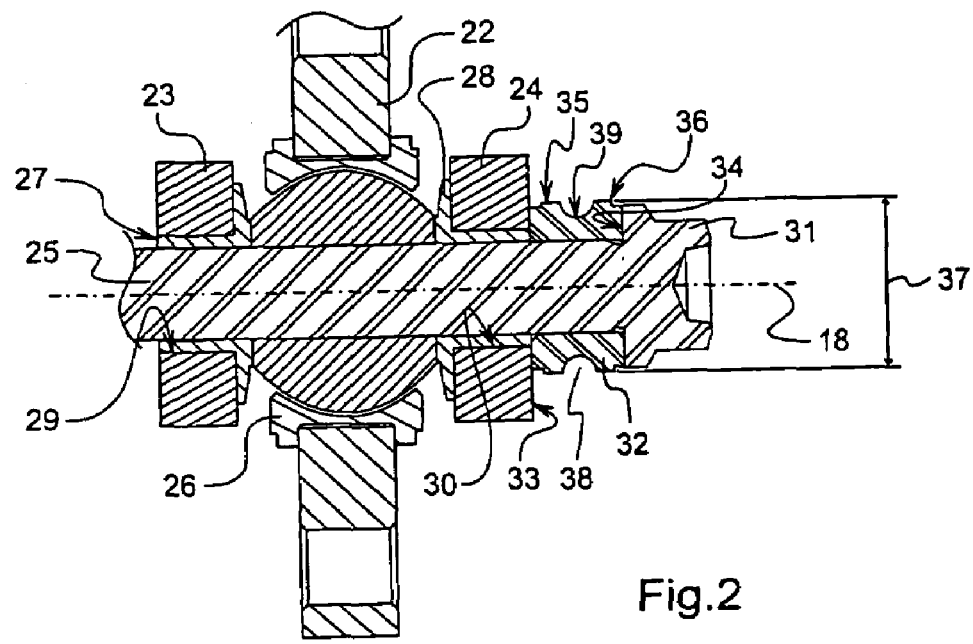
FIG. 2 is a longitudinal section view of the lag damper hinge of FIG. 1, in which the shaft carries a cylindrical ring incorporating the first and second abutments in a preferred embodiment of the invention.

With reference to FIG. 2 in particular, the hinge between the damper and the hub about the axis 18 that extends in a plane substantially perpendicular to the axis 11, takes place via a flange 22 secured to the damper, a fork comprising two tines 23 and 24 secured to the hub, and a stationary shaft 25 or bearing secured to said fork, and a ball 26 mounted on the shaft 25 and connecting it to the flange 22.

Figure 5:
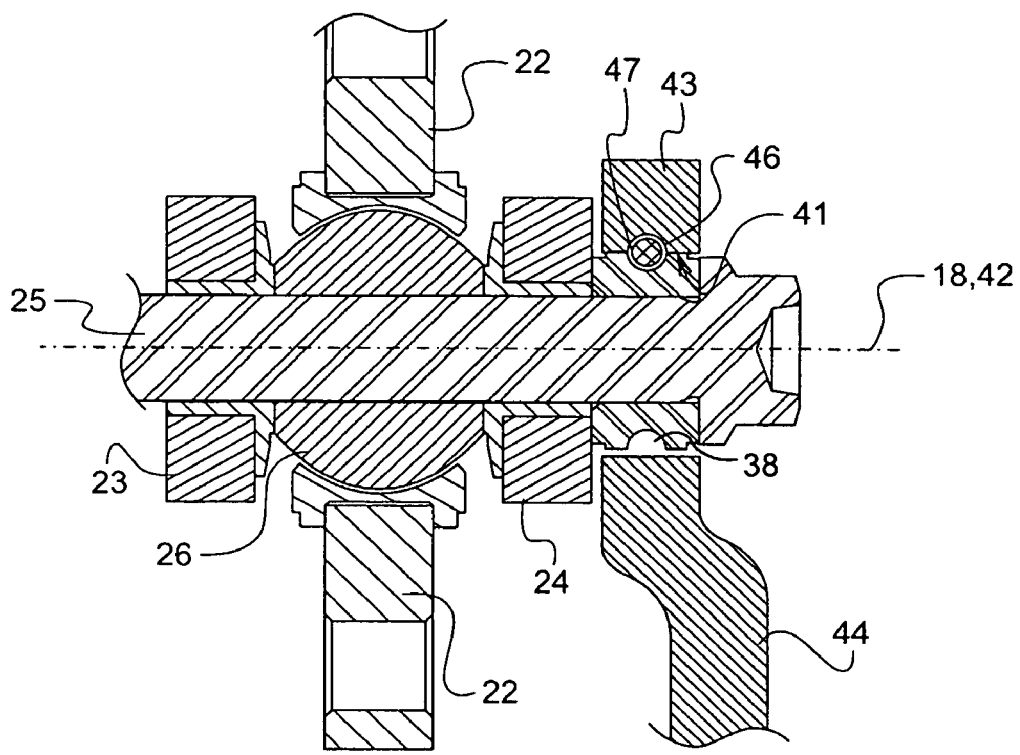
FIG. 5 is a section view similar to FIG. 2 showing in greater detail the fastening of the head of the blocking rod on the end of the hinge shaft fitted with the ring incorporating the two bearing surfaces.
Figure 7:
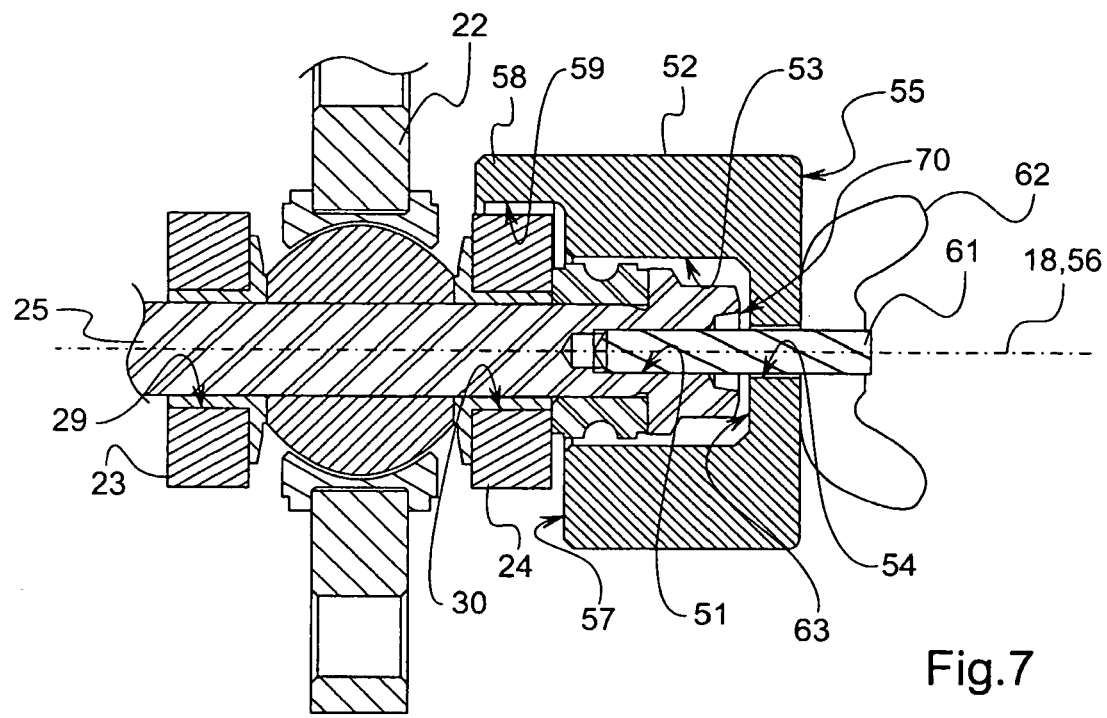

The shaft 25 passes through two rings 27, 28 engaged respectively in two bores 29, 30 on a common axis and formed respectively in the tines 23, 24 of the fork (see FIGS. 2, 5, and 7 in particular).

The shaft 25 presents a smooth central portion receiving the ball 26, and a projecting head 31.

A ring 32 is mounted on the shaft 25, clamped between the outside face 33 of the tine 24 and the bearing face 34 of the head 31 of the screw whose shank forms the shaft 25.

The ring 32 presents two outside surface portions 35 and 36 of cylindrical shape about the axis 18 in common with the shaft 25, and of diameter 37 greater than the diameter of the head 31 of the screw.

The two outside surface portions 35 and 36 are separated by an annular groove 38 of semicircular section that is defined by a surface 39 in the form of half a torus about the axis 18.

Figure 3:
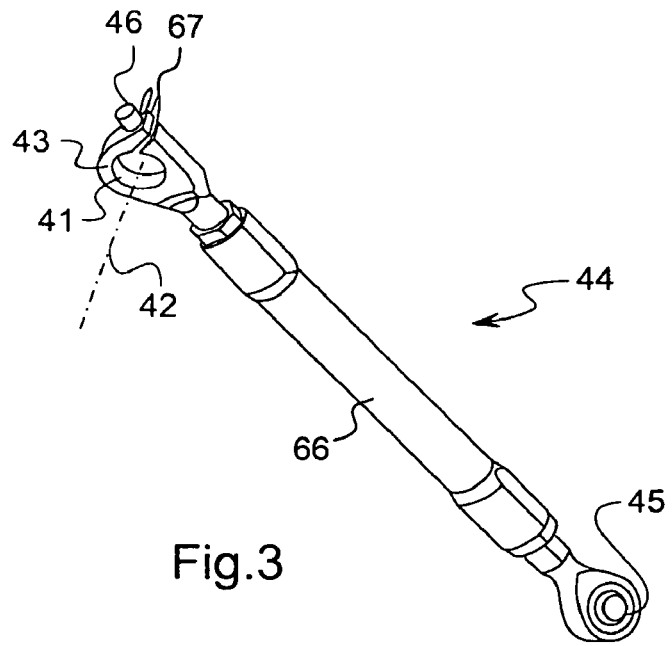
FIG. 3 is a perspective view of a blocking rod used to block the pitch of a foldable blade of a helicopter rotor as shown in FIGS. 4 and 5.
Figure 4:
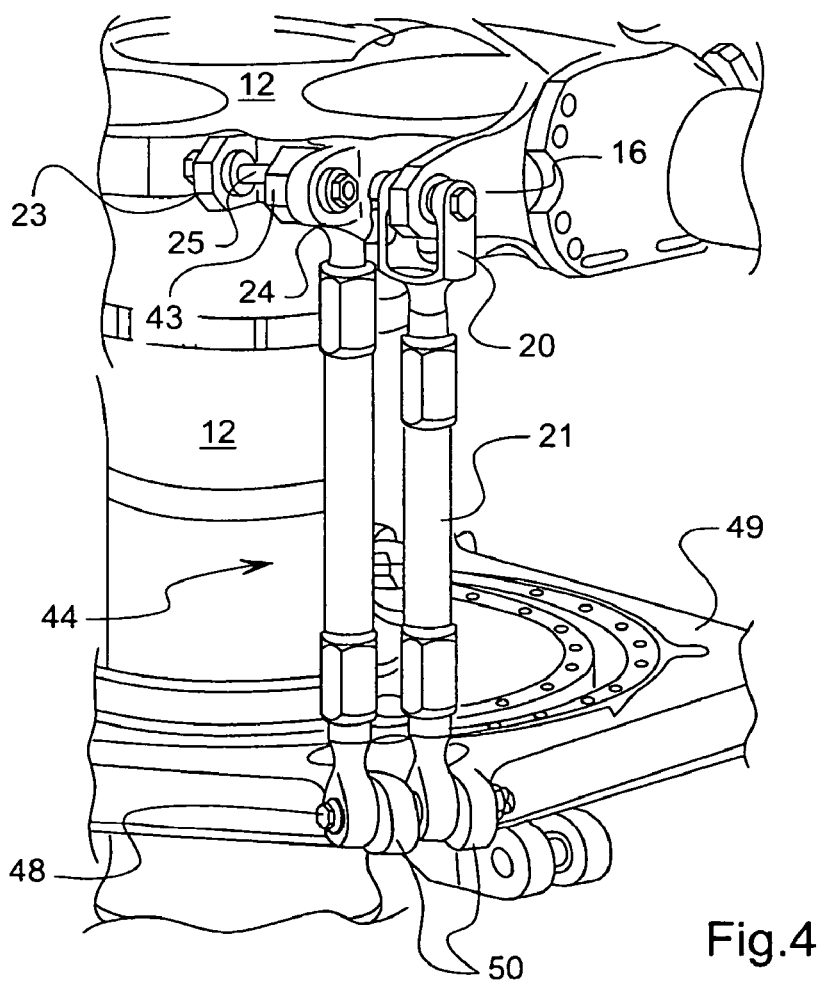
FIG. 4 is a fragmentary perspective view showing the blocking rod of FIG. 3 secured between the end of the hinge shaft of the lag damper and the rotary swashplate of the blade pitch control system.

As shown in FIGS. 3 to 5, the surfaces 35 and 36 serve as a cylindrical bearing surface for a bearing surface formed by the inside face of a bore 41 of axis 42 that passes through the top end 43 of a locking rod 44.

With reference to FIGS. 3 and 5, the rod 44 includes a socket 45 at its bottom end, and a body 66 of adjustable length interconnecting the ends 43 and 45 of the rod.

The tooling for temporarily blocking the pitch of a blade further comprises a cylindrical peg 46 designed to be engaged in a channel 47 formed in the head 43 of the rod 44; this channel opens out tangentially relative to the axis 42 of the bore 41, into said bore.

The diameter of the peg 46 and the position of the channel 47 are designed so that the peg 46 engages with little clearance in the groove 38 provided in the ring 32 when the head 43 has been engaged around the ring, so as to prevent the head 43 of the rod 44 moving in translation along the axis 18, 42 relative to the shaft 25, thereby holding the head of the blocking rod stationary relative to the rotor hub.

In the blocking position shown in FIG. 4, the socket 45 at the foot of the rod 44 is engaged around the end of a shaft 48 secured to the rotary swashplate 49 via a fork 50; the shaft 48 also serves for securing the pitch control rod 21 to the swashplate 49.

To block the swashplate 49 in position, and thus block the pitch of the blades via their respective rods 21, the procedure is as follows:

the socket 45 of the rod 44 is initially secured to the end of the shaft 48 hinging the rod 21 to the swashplate 49;

the head 43 of the rod 44 is engaged around the ring 32; and the peg 46 is then inserted in the groove 38 of the ring 32, and said peg is preferably held in position by means of a pin (referenced 67, FIG. 3).

Thereafter the hydraulic assistance to the flight controls of the helicopter is turned off.

The system can be secured temporarily to the rotor in simple manner, and can be separated from the rotor in order to deploy the blades without running the risk of damaging the parts of the rotor; the extra weight that is added permanently, corresponding substantially to the weight of the ring 32, is very small.

In the embodiment shown in FIGS. 6 to 8, a tapped orifice 51 is formed in the head 31 of the screw 25 along the axis 18.

The tooling for blocking the pitch of a blade includes a part 52 in the form of a shell presenting a main bore 53 extended by a secondary bore 54 opening out into a face 55 of the part 52; the bores 53 and 54 are cylindrical and on a common axis 56.

On its face 57 opposite from the face 55 and into which the bore 53 opens out, a projection 58 presents a bearing face 59 designed to co-operate with a face 60 (FIG. 6) of the tine 24 of the fork that constitutes an abutment in rotation.

The tooling also includes a screw 61 screwed into the tapped orifice 51, passing through the bore 54 of the part 52, and a nut 62; the nut 62 is screwed onto the screw 61 so as to press against the face 55 of the part 52 and put the bearing face 57 of the part 52 into contact with the outside face (reference 33, FIG. 2) of the tine 24, or else to put the bottom 63 of the bore 53 into contact with the face 70 of the head 31 of the screw 25 so as to block the part 52 in translation along the axis 18 relative to the hub; thus, in this embodiment, the groove 38 of the ring 32 can be omitted, the second abutment being formed by the face 33 of the tine 24 or else by the front face 70 of the shaft 25.

Blocking the part 52 against rotation relative to the hub enables a cavity 64 provided in the outside face of the part 52 to be positioned angularly facing a projection 65 (FIGS. 6 and 8) of complementary shape provided at the end of the pitch lever 16 such that the projection 65 can be engaged in the cavity 64 to block the pitch of the corresponding blade.

In the various embodiments of the invention, the abutments 35, 36, and 39 secured to the hub may be formed on (integrated in) the head 31 of the shaft/screw 25 rather than on a ring (such as 32) that is separate from the shaft 25.

In the various embodiments, these abutments serve to center or position the blocking tooling, and also to hold it in the operating position.

The ring 32 or the parts incorporating the abutments that co-operate with the complementary bearing faces integrated in the parts of the tooling withstand the vertical forces transmitted by the sleeve, the pitch lever, or the pitch and blocking rods, while a blade is being folded or unfolded.

What is claimed is:

1. A rotor for a rotorcraft having foldable hinged blades, the rotor comprising a hub (10), each blade being connected to the hub by a sleeve, each sleeve being hinged about a pitch axis (15) relative to the hub, the rotor including a lag damper (14) associated with each blade, each damper being hinged both to the hub and to the corresponding sleeve, the rotor including a system for controlling blade pitch via a respective pitch lever (16) secured to each sleeve, the rotor including two abutments designed to co-operate with tooling for blocking blade pitch, a first abutment presenting a bearing surface (35, 36) matching a shape of revolution about an axis (18) of revolution to center a bearing face (41, 53) of the tooling relative to said axis, and a second abutment (33, 39, 70) designed to position a bearing face (46, 57, 63) of the tooling axially along said axis of revolution, the first abutment and the second abutment being secured to a connection system hinged between a lag damper and the hub.

2. A rotor according to claim 1, in which the first abutment and the second abutment are formed in a part (32) that is secured to the hinged connection system.

3. A rotor according to claim 1, in which the surface of revolution of the first abutment is formed on the outside portion of a part (32) secured to the hinged connection system.

4. A rotor according to claim 3, in which the hinge connection includes a fork (23, 24) receiving a shaft (25), and in which the first abutment is formed by an outside surface of a ring (32) through which said shaft passes or integrated with said shaft.

5. A rotor according to claim 1, in which the first abutment presents a shape that is a portion of a paraboloid, a hyperboloid, a cone, or a sphere, and forms at least a portion of the second abutment.

6. A rotor according to claim 1, in which the first abutment is cylindrical and of circular section, and is distinct from the second abutment.

7. A rotor according to claim 1, in which the surface of the second abutment is plane and perpendicular to the axis of revolution of the first abutment.

8. A rotor according to claim 1, in which the surface of the second abutment matches the shape of a half-torus, and is in the form of an annular groove (38) formed in a cylindrical ring (32) whose outside surface forms the first abutment.

9. Tooling for blocking the pitch of the blades of a rotor, the rotor comprising a hub (10), each blade being connected to the hub by a sleeve, each sleeve being hinged about a pitch axis (15) relative to the hub, the rotor including a lag damper (14) associated with each blade, each damper being hinged both to the hub and to the corresponding sleeve, the rotor including a system for controlling blade pitch via a respective pitch lever (16) secured to each sleeve, the rotor including two abutments designed to co-operate with tooling for blocking blade pitch, a first abutment presenting a bearing surface (35, 36) matching a shape of revolution about an axis (18) of revolution to center a bearing face (41, 53) of the tooling relative to said axis, and a second abutment (33, 39, 70) designed to position a bearing face (46, 57, 63) of the tooling axially along said axis of revolution, the first abutment and the second abutment being secured to a connection system hinged between a lag damper and the hub, the tooling presenting a first bearing face (41, 53) complementary to the first abutment, and a second bearing face (46, 57, 63) complementary to the second abutment.

10. Tooling according to claim 9, comprising rods (44) for blocking the rotary swashplate (49) of the system for controlling the pitch of the rotor blades, the top end (43) of each blocking rod including said first bearing face which is formed by a bore (41) designed to be placed with little clearance around a ring (32) carrying the first abutment.

11. Tooling according to claim 10, including a pin or peg (46) co-operating with the second abutment that is in the form of an annular groove to prevent the blocking rod from moving relative to the hub in translation along the common axis (18, 42) of the bore in the head of the rod and of the first abutment.

12. Tooling according to claim 9, comprising a blocking shell (52) presenting a depression (64) such as a fork designed to receive a projection (65) of complementary shape and secured to the pitch lever, or a projection such as a finger designed to be received in a depression of complementary shape secured to the pitch lever.

13. Tooling according to claim 12, in which the shell presents a bore (53) designed to co-operate with the first abutment and also presenting a third bearing face (59) designed to co-operate with a third abutment (60) secured to the hub in order to prevent the shell from moving in rotation about the axis (18) of revolution of the first abutment.

14. Tooling according to claim 12, further including a screw (61) having a head for pressing the generally plane second bearing face (57, 63) of the shell against the second abutment (33, 70) secured to the hub.

15. Tooling according to claim 14, wherein said screw is engaged in a tapped orifice (51) provided in the hub.

16. Tooling according to claim 15, wherein said screw is engaged in the shaft providing the hinged connection between the hub and the lag damper.

17. A method of blocking the pitch of a sleeve of a blade of a rotor, the rotor comprising a hub (10), each blade being connected to the hub by a sleeve, each sleeve being hinged about a pitch axis (15) relative to the hub, the rotor including a lag damper (14) associated with each blade, each damper being hinged both to the hub and to the corresponding sleeve, the rotor including a system for controlling blade pitch via a respective pitch lever (16) secured to each sleeve, the rotor including two abutments designed to co-operate with tooling for blocking blade pitch, a first abutment presenting a bearing surface (35, 36) matching a shape of revolution about an axis (18) of revolution to center a bearing face (41, 53) of the tooling relative to said axis, and a second abutment (33, 39, 70) designed to position a bearing face (46, 57, 63) of the tooling axially along said axis of revolution, the first abutment and the second abutment being secured to a connection system hinged between a lag damper and the hub, the method comprising the steps of:

locking the pitch of all of the sleeves via hydraulically-assisted flight controls;

providing a tooling, the tooling presenting a first bearing face (41, 53) complementary to the first abutment, and a second bearing face (46, 57, 63) complementary to the second abutment; and temporarily securing tooling to the hub by using abutments provided for this purpose, and then turning off the hydraulic assistance.

* * * * *